Patented Apr. 4, 1939

2,152,637

UNITED STATES PATENT OFFICE 2,152,637

WELDING

Anthony G. de Golyer, New York, N. Y.

No Drawing. Application October 30, 1937,
Serial No. 171,896

4 Claims. (Cl. 219—8)

This invention relates to welding and relates particularly to weld deposits of ferrous alloys containing boron.

The weld metal compositions comprised in this invention are intended primarily for deposition on surfaces or areas exposed to severe conditions of abrasive wear or impact or both.

I have found that certain ferrous alloys containing as essential components tungsten, molybdenum or chromium and appreciable amounts of boron are especially valuable for deposition by welding of metal possessing a high degree of resistance to abrasive wear and high resistance to deformation under impact or compression. I have also found that such alloy steels or ferrous base alloys containing from 0.50% to 1.50%, or more boron are difficult to forge or otherwise mechanically work. Consequently, it is difficult and expensive to manufacture ferrous alloys containing appreciable amounts of tungsten, molybdenum or chromium, and boron in the form of weld rods by the usual methods of forging, rolling and drawing.

I have discovered that all or a major portion of the requisite boron content of the weld deposits can be effectively and economically introduced therein during the welding operation. The object of this invention is to provide a means of introducing desired amounts of boron into ferrous base alloys during the welding operation and to thus produce weld deposits which have physical properties and characteristics rendering them particularly valuable for the surfacing of wearing parts of various kinds of machinery, equipment, tools, etc.

I have found that boron can be introduced into weld metal during the welding operation by employing a metallic rod having an adherent coating containing a boron alloy or chemical compound of boron which is readily soluble in the molten metal produced by the welding operation. Boron can be added in this manner by either the gas welding or arc welding process, but I usually prefer to employ arc welding.

The essential components of my weld metal compositions are metal from the group tungsten, molybdenum and chromium, boron and iron. The principal constituent is iron. The content of metal selected from the group tungsten, molybdenum or chromium should be between 2% and 20% and the boron content should be between 0.15% and 1.50%. It will be understood that the weld metal will also contain minor amounts of impurities incidental to manufacture such as carbon, manganese and silicon, especially as such elements are usually present in the materials used for manufacturing the weld rods.

In manufacturing the new electrodes or weld rods I usually prefer to have the metallic base or support member composed of a ferrous base alloy containing all or substantially all of the essential components desired in the weld metal with the exception of boron. For example, a ferrous base alloy containing approximately 6% of tungsten, less than 1% each of manganese, silicon and carbon and the balance substantially all iron may be used in the form of a rod having any desired diameter and length. Such rod may be more or less covered with a coating, the one essential constituent of which is a boron alloy or chemical compound of boron which is readily soluble in the molten metal produced from the metallic rod during welding. The boron containing constituent, for example, may be ferro-boron. The boron containing constituent may be admixed with various minerals or other materials which will be more or less inert during the welding operation such, for example, as slag forming materials. The mixture containing the boron alloy can be bonded with any suitable agent such as sodium silicate, dextrine, cellulose compounds, etc. and the mixture applied to all or any desired portion of the metallic rod by any suitable method. As an illustration, when it is desired to coat the electrode with a flux by the usual dipping or extrusion methods the boron containing alloy can be included in the flux. Instead of using a ferrous alloy containing tungsten I can use one containing molybdenum or chromium or one containing any two or more of the metals of this group. Instead of using ferro-boron as the source of boron in the weld metal I can use an alloy or chemical compound of boron with tungsten, molybdenum, carbon or any other element which will not adversely affect the physical properties and characteristics of the weld metal. It will be understood that if the source of boron is a metallic alloy or chemical compound of boron, such as boride of molybdenum, for example, that both boron and molybdenum will be introduced into the weld metal. It should be understood that the boron in the boron containing material used in this invention must always be present in a metallic, i. e. unoxidized condition.

I have found that weld metal containing from 2% to 20% of metal selected from the group tungsten, molybdenum and chromium, boron from 0.15% to 1.50% and the balance substantially iron, when deposited with electrodes of the present invention, is particularly valuable for use in the form of overlays or inlays on a wide range of industrial equipment. For example, such weld deposits have a hardness of from 500 to 700 Brinell when deposited on 14% manganese steel and a hardness of from 575 to 775 Brinell when deposited on carbon steel or alloy steel. The fact that deposits of the present compositions are both highly resistant to abrasive wear and deformation under impact or compression render them useful for many purposes such, for example, as surfacing or rebuilding manganese steel castings in the form of dipper teeth, crusher plates, etc., surfacing parts of machinery exposed to excessive abrasive wear or for forming or rebuilding the tip of a metal cutting tool.

I claim:

1. A weld rod comprising a metallic support portion of a ferrous alloy containing metal selected from the group tungsten, molybdenum and chromium, and an adherent coating having therein a boron containing compound which will dissolve in the metal of said support portion to form a weld deposit containing metal selected from the group tungsten, molybdenum and chromium 2% to 20%, boron 0.15% to 1.50% and the balance substantially iron.

2. A weld rod comprising a metallic support portion of a ferrous alloy containing tungsten, and an adherent coating having therein a boron containing compound which will dissolve in the metal of said support portion to form a weld deposit containing tungsten 2% to 20%, boron 0.15% to 1.50% and the balance substantially iron.

3. A weld rod comprising a metallic support portion of a ferrous alloy containing molybdenum, and an adherent coating having therein a boron containing compound which will dissolve in the metal of said support portion to form a weld deposit containing molybdenum 2% to 20%, boron 0.15% to 1.50% and the balance substantially iron.

4. A weld rod comprising a metallic support portion of a ferrous alloy containing chromium, and an adherent coating having therein a boron containing compound which will dissolve in the metal of said support portion to form a weld deposit containing chromium 2% to 20%, boron 0.15% to 1.50% and the balance substantially iron.

ANTHONY G. DE GOLYER.